(12) United States Patent
Wooden et al.

(10) Patent No.: US 8,960,609 B2
(45) Date of Patent: Feb. 24, 2015

(54) MINIMALLY INTRUSIVE WINGTIP VORTEX WAKE MITIGATION USING INSIDE-MOLD-LINE SURFACE MODIFICATIONS

(75) Inventors: Perry Wooden, Crowley, TX (US);
Ruble E. Moor, Burleson, TX (US);
Eric F. Charlton, Grapevine, TX (US);
Daniel N. Miller, Bainbridge Island, WA (US); Edwin L. Blosch, Keller, TX (US); Jeffrey J. Azevedo, Hudson Oaks, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 242 days.

(21) Appl. No.: 13/326,592

(22) Filed: Dec. 15, 2011

(65) Prior Publication Data

US 2013/0153711 A1    Jun. 20, 2013

(51) Int. Cl.
*B64C 23/06*    (2006.01)
(52) U.S. Cl.
USPC ...................... 244/199.2; 244/199.4; 244/130
(58) Field of Classification Search
USPC ................ 244/198, 199.1, 199.2, 199.4, 200, 244/200.1, 204, 207–209, 130
See application file for complete search history.

(56) References Cited

U.S. PATENT DOCUMENTS

| 2,163,655 | A | * | 6/1939 | Zimmerman | 244/199.1 |
|---|---|---|---|---|---|
| 2,438,942 | A |   | 4/1948 | Polk | |
| 2,507,611 | A | * | 5/1950 | Pappas et al. | 244/198 |
| 2,650,781 | A | * | 9/1953 | Taylor | 244/198 |
| 3,298,636 | A | * | 1/1967 | Arnholdt | 244/198 |
| 3,831,885 | A | * | 8/1974 | Kasper | 244/199.1 |
| 5,806,807 | A | * | 9/1998 | Haney | 244/199.3 |
| 6,283,406 | B1 |   | 9/2001 | Remington et al. | |
| 7,264,444 | B2 |   | 9/2007 | Dunn | |
| 7,832,689 | B2 | * | 11/2010 | Prince et al. | 244/200.1 |
| 2010/0303634 | A1 | * | 12/2010 | Long | 416/90 A |

* cited by examiner

*Primary Examiner* — Timothy D Collins
*Assistant Examiner* — Jamie S Stehle
(74) *Attorney, Agent, or Firm* — Reising Ethington P.C.; John J. Snyder

(57) ABSTRACT

An airfoil tip vortex mitigation device comprising an intake port disposed in a first surface of an airfoil and an exit port in fluid communication with the intake port and disposed in a second surface of the airfoil where air pressure is less than at the first surface when the airfoil is producing lift. The channel and exit port are positioned and configured to direct diverted air in such a way as to weaken an airfoil tip vortex that's produced by the airfoil when the airfoil is producing lift.

17 Claims, 2 Drawing Sheets

MINIMALLY INTRUSIVE WINGTIP VORTEX WAKE MITIGATION USING INSIDE-MOLD-LINE SURFACE MODIFICATIONS

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND

1. Field

Mitigation of wake turbulence via weakening and dispersion of wake vortices generated at outboard edges of aircraft wings or outboard and/or inboard edges of ailerons, flaps, or other airfoils including horizontal and vertical stabilizers.

2. Description of Related Art Including Information Disclosed Under 37 CFR 1.97 AND 1.98

The persistence of a vortex trailing behind a lifting airfoil such as a wing is dependent not only upon vortex strength, but also upon how well a core of the vortex is defined. Vortex strength is governed by lift, which depends upon area and pressure differences between upper and lower airfoil surfaces. The core is well-defined if the airfoil is thin and if there is a high pressure difference between the upper and lower surfaces near an outboard tip of the airfoil. This allows a streamline to roll around the outboard edge or tip of a wing or the inboard and/or outboard edges or tips of a flap, aileron, or other airfoil, from the high pressure region to the low pressure region along a very short distance. This results in a highly curved, fast moving streamline in a well-defined vortex core, which can persist for a long time downstream of the airfoil. The formation of a well-defined vortex core may be impeded by lengthening the distance traveled by the streamlines rolling from the high pressure region to the low pressure regions. This has been accomplished by adding to a wing tip a geometry feature such as extra thickness, a non-lifting wing-tip extension, or a device such as a winglet. Such devices are designed to have lift characteristics that compensate for their own weight. They also tend to add drag, although they are designed to add as little as possible. The purpose of such features is to prevent the lifting vortex from forming a well-defined core, thereby allowing the vortex to dissipate quickly.

SUMMARY

An airfoil tip vortex mitigation device comprising an intake port disposed in a first surface of an airfoil, an exit port in fluid communication with the intake port and disposed in a second surface of the airfoil where air pressure is less than at the first surface when the airfoil is producing lift. A channel connects the intake port and the exit port and the channel and exit port are positioned and configured to direct diverted air in such a way as to weaken an airfoil tip vortex generated by the airfoil when the airfoil is producing lift.

DRAWING DESCRIPTIONS

These and other features and advantages will become apparent to those skilled in the art in connection with the following detailed description and drawings of one or more embodiments of the invention, in which.

Figure 4:
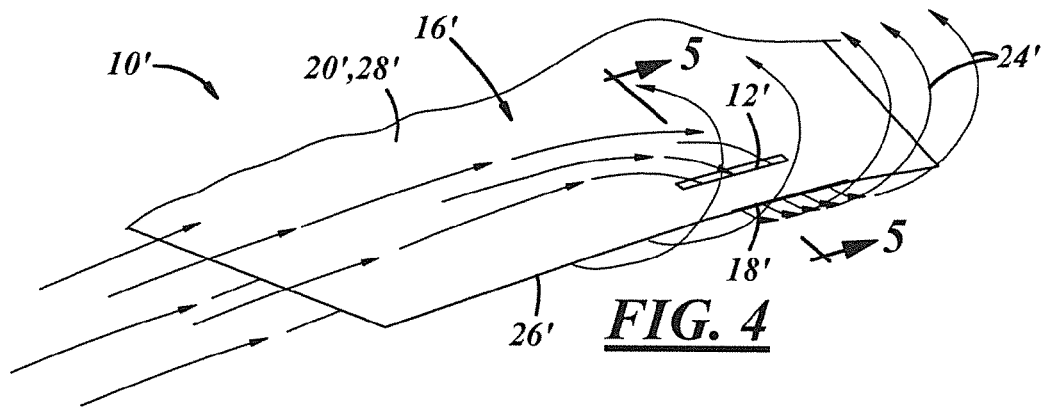
FIG. 4 is a partial top orthogonal view of an outboard portion of an airfoil with a second embodiment of an airfoil tip vortex mitigation device disposed in the airfoil adjacent a tip of the airfoil, and with arrows showing general airflow patterns across the airfoil and through the device.
Figure 5:
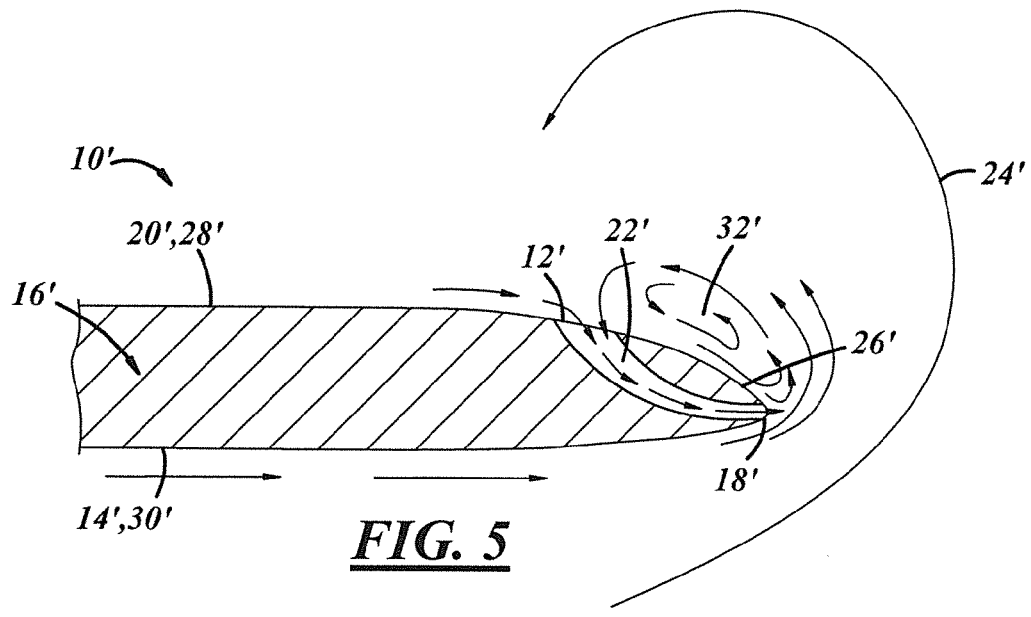
Figure 6:
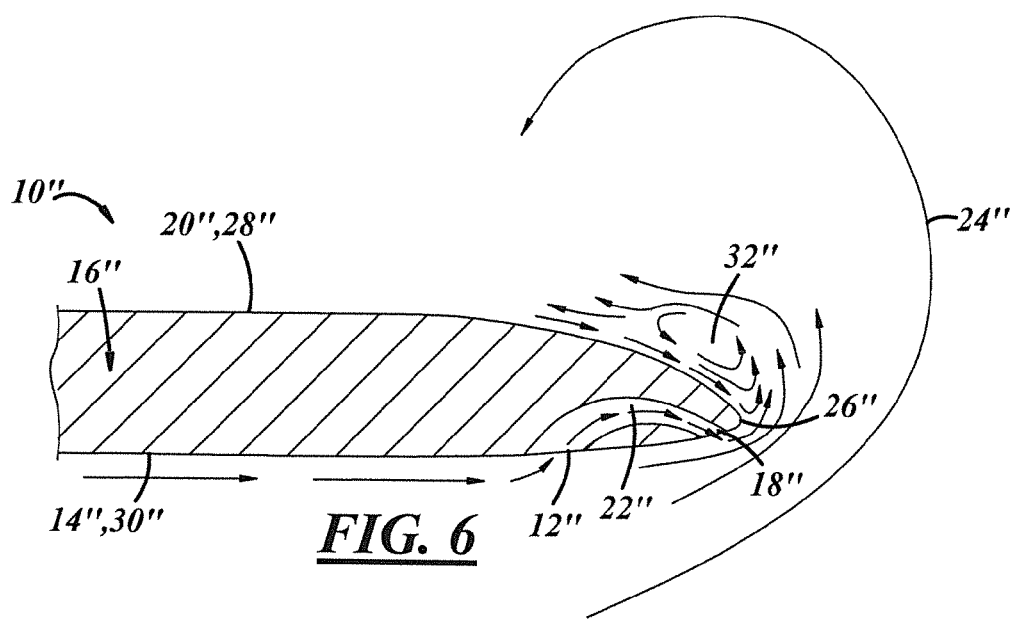

FIG. 5 is a partial cross-sectional front view of the airfoil and airfoil tip vortex mitigation device of FIG. 4 taken along line 5-5 of FIG. 4 with arrows showing general airflow patterns across the airfoil and through the device; and FIG. 6 is a partial cross-sectional front view of an airfoil and a third embodiment of an airfoil tip vortex mitigation device shown disposed in the airfoil adjacent a tip of the airfoil, and with arrows showing general airflow patterns across the airfoil and through the device.

DETAILED DESCRIPTION

A device for weakening and/or dispersing a core of an airfoil wake vortex generated at an outboard edge or tip of a wing, or an inboard and/or outboard edge or tip of an aileron, flap, or other airfoil, including horizontal and vertical stabilizers, is generally shown at 10 in FIGS. 1-6. A second embodiment of the device is generally shown at 10' in FIGS. 4 and 5. A third embodiment of the device is shown at 10" in FIG. 6. Reference numerals with the designation prime (') or double prime (") in FIGS. 4-6 indicate alternative configurations of elements that also appear in the first embodiment. Unless indicated otherwise, where a portion of the following description uses a reference numeral to refer to FIGS. 1-3, that portion of the description applies equally to elements designated by primed numerals in FIGS. 4 and 5 and by double-primed numerals in FIG. 6. In this document the term "longitudinal" is used to refer to a direction parallel to the motion of freestream air relative to a subject aircraft. The term "inboard" is used to refer to a direction generally toward a longitudinal fuselage centerline of an aircraft from a point spaced laterally from that fuselage centerline, and the term "outboard" is used to refer to a direction away from the longitudinal centerline of the aircraft. The words edge and tip, in reference to an airfoil, are used interchangeably and are intended to include within their scope a leading edge of a delta wing, strake, or other swept airfoil.

Figure 1:
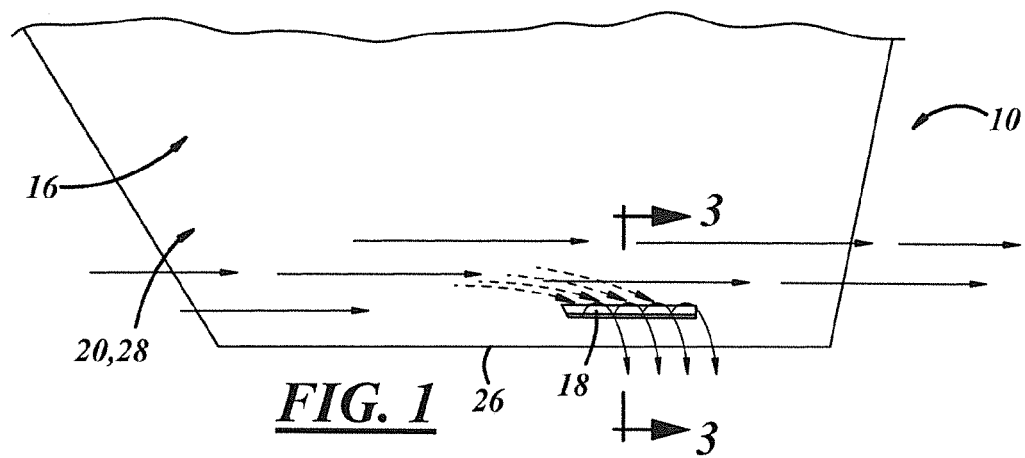
FIG. 1 is a partial top view of an outboard portion of an airfoil with an airfoil tip vortex mitigation device disposed in the airfoil adjacent a tip of the airfoil, and with arrows showing general airflow patterns across the airfoil and through the device.
Figure 2:
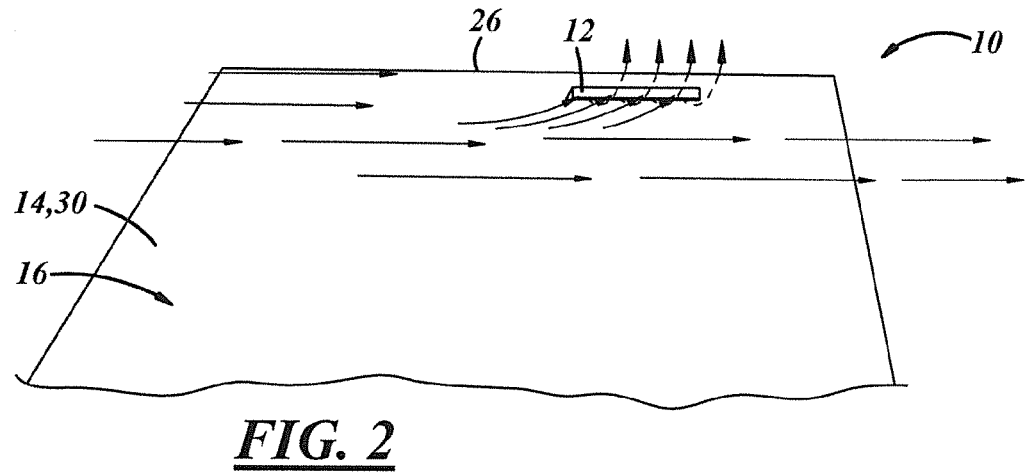
FIG. 2 is a partial bottom view of the airfoil and the airfoil tip vortex mitigation device of FIG. 1 with arrows showing general airflow patterns across the airfoil and through the device.
Figure 3:
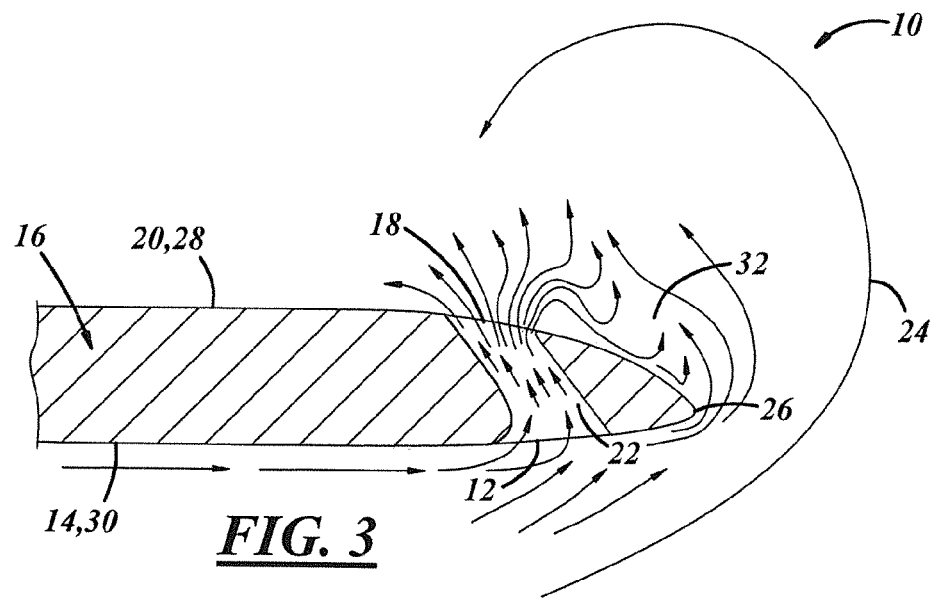
FIG. 3 is a partial cross-sectional front view of the airfoil and the airfoil tip vortex mitigation device of FIG. 1 taken along line 3-3 of FIG. 1 with arrows showing general airflow patterns across the airfoil and through the device.

As shown in FIGS. 1-3, the device 10 may include an intake port 12 disposed in a high pressure surface 14 of an airfoil 16 and an exit port 18 in fluid communication with the intake port 12 and disposed in a low pressure surface 20 of the airfoil 16. Air pressure is lower at the low pressure surface 20 than at the high pressure surface 14 when free stream air is flowing generally chordwise over the airfoil 16 and the airfoil is producing lift. As best shown in FIG. 3, a channel 22 may extend through the airfoil 16, i.e., within the airfoil's mold line, and provide fluid communication between the intake port 12 and the exit port 18. As best shown in FIG. 3, the channel 22 and exit port 18 may be positioned and configured to passively direct captured air from the intake 12 in such a way as to weaken a vortex 24 produced at the tip 26 of the airfoil 16. The device 10 provides a passive fluidic injection or blowing source that aerodynamically thickens the wing tip edge and accelerates the dissipation of a core 32 of an airfoil tip vortex 24 to mitigate the strength of the airfoil tip vortex 24, preferably without adding loads to the airfoil 16 as would a winglet or the like, and preferably without incurring a significant mechanical or drag impact.

The channel 22 may be positioned adjacent an edge or tip 26 of the airfoil 16 to allow airflow from the top 28 and bottom 30 surfaces to interact just short of the edge 26 of the airfoil 16 without contributing to tip vortex formation, and to minimize negative effects that the ports 12, 18 and channel 22 might have on lift being produced by the airfoil 16. The channel 22 may also or alternatively be positioned close to a center of pressure of the airfoil 16 to minimize pitch moment effects and avoid changes in load distribution along the airfoil 16. The channel 22 may also be routed within the airfoil's mold line as described above to preclude profile intrusion and consequent drag effects.

As best shown in FIGS. 2 and 3, the intake port 12 may be a slot oriented generally chordwise and disposed in a bottom surface 30 of the airfoil 16. As best shown in FIGS. 1 and 3, the exit port 18 may be a slot oriented generally chordwise and disposed in a top surface 28 of the airfoil 16. The intake 12 may thus divert higher pressure air from the airfoil bottom surface 30 that would otherwise flow spanwise and feed an airfoil tip vortex 24. The high pressure air is instead directed by the channel 22 upward through the airfoil 16 to the top surface exit port 18 where it can spread out and mix with the airflow that sustains the tip vortex 24. Allowing air to flow from the bottom surface 30 to the top surface 28 also reduces pressure differential between the low pressure top surface 28 and the high pressure bottom surface 30 of the airfoil 16 thus further mitigating formation of a tip vortex 24 at the edge 26.

In the second embodiment of a device 10', and as shown in FIGS. 4 and 5, a channel 22' and exit port 18' may be positioned and configured to direct diverted air directly into an airfoil tip vortex 24' to disrupt the vortex 24' by spreading and mixing the diverted air directly with the vortex 24'. According to this embodiment, the intake port 12' may be provided in a top surface 28' of an airfoil 16', the exit port 18' may be a slot provided at or adjacent and along an edge of an airfoil tip 26', and the channel 22' may be configured to inject low pressure, relatively low-speed air from the top surface 28' through the exit port 18' directly into higher speed airflow moving from under the airfoil 16' to feed a core region 32' of the tip vortex 24'. This tends to decelerate airflow from under the airfoil 16' thus reducing the energy and hastening dissipation of the tip vortex 24' downwind from the airfoil 16' without disrupting beneficial local lift effects of the tip vortex 24'. Also, as is best shown in FIG. 5, some airflow at the core region 32' of the tip vortex 24' may find its way to the intake port 12' as the airflow rolls up over the top surface 28' of the airfoil 16'. Thus, rather than being pressed and forced to roll under tightly against the top airfoil surface 28' at a 'stagnation point flow' (flow impinging on a solid object), the core region 32' of the tip vortex 24' may continue turning more smoothly and in a broader arc. This allows the core region 32' of the tip vortex 24' to spread out, resulting in earlier dissipation of the tip vortex 24' aft of the airfoil 16'.

In the third embodiment of a device 10", and as shown in FIG. 6, an intake port 12" may be provided in a bottom surface 30" of an airfoil 16" and a channel 22" may be configured to inject bottom surface air from the intake port 12" into airflow feeding a core 32" of a tip vortex 24". As is also shown in FIG. 6, an exit port 18" may be positioned adjacent, rather than at, the airfoil tip 26", and formed into a bottom surface 30" of the airfoil 16".

A device constructed as described above accelerates the dissipation of wake vortices, reducing turbulence hazards to following aircraft. The device may also be arranged to have no effect on wing loading, meaning little or no other modification is needed to reinforce the wing or airfoil structure.

This description, rather than describing limitations of an invention, only illustrates embodiments of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. An airfoil tip vortex mitigation device comprising:
   an intake port disposed in a first surface of an airfoil;
   an exit port in fluid communication with the intake port and disposed in a second surface of the airfoil where air pressure is less than at the first surface when the airfoil is producing lift;
   a channel connecting the intake port and the exit port;
   the exit port being disposed spanwise inward relative to the intake port such that the channel is angled spanwise inward from intake to exit port; and
   the channel and exit port being positioned and configured to spread out diverted air over the second surface in such a way as to aerodynamically thicken the airfoil tip and thus accelerate dissipation of a core of an airfoil tip vortex generated by the airfoil when the airfoil is producing lift.

2. An airfoil tip vortex mitigation device as defined in claim 1 in which the channel extends and provides fluid communication between the intake port and the exit port.

3. An airfoil tip vortex mitigation device as defined in claim 2 in which the channel is positioned adjacent a tip of the airfoil.

4. An airfoil tip vortex mitigation device as defined in claim 2 in which the channel is routed through the airfoil.

5. An airfoil tip vortex mitigation device as defined in claim 4 in which the channel and exit port are positioned and configured to weaken the airfoil tip vortex by spreading out and mixing airflow that creates and sustains the tip vortex.

6. An airfoil tip vortex mitigation device as defined in claim 1 in which the intake port is disposed in a bottom surface of the airfoil and the exit port is disposed in a top surface of the airfoil such that higher pressure air is directed by the channel upward from the bottom surface through the airfoil to the top surface exit port.

7. An airfoil tip vortex mitigation device as defined in claim 6 in which the intake port is disposed in a bottom surface of the airfoil in a position to divert high pressure air from a generally spanwise path that would otherwise travel past the airfoil tip and feed an airfoil tip vortex.

8. An airfoil tip vortex mitigation device as defined in claim 6 in which the channel and exit port are configured and positioned to allow air to flow from the high pressure surface to the low pressure surface.

9. An airfoil tip vortex mitigation device as defined in claim 8 in which the intake and exit ports are disposed adjacent a tip of the airfoil.

10. An airfoil tip vortex mitigation device in which:
    an exit port is formed adjacent a tip of an airfoil;
    a channel connects the exit port to an intake port;

the exit port being disposed spanwise inward relative to the intake port such that the channel is angled spanwise inward from intake to exit port; and the channel and exit port are configured to direct air into a core region of an airfoil tip vortex generated by the airfoil when the airfoil is producing lift.

11. An airfoil tip vortex mitigation device in which:

an exit port is formed adjacent a tip of an airfoil;

an intake port is formed in a top surface of the airfoil;

a channel connects the exit port to the intake port; and the channel and exit port are configured to direct air into an airfoil tip vortex generated by the airfoil when the airfoil is producing lift.

12. An airfoil tip vortex mitigation device as defined in claim 10 in which the intake port is formed in a bottom surface of the airfoil.

13. An airfoil tip vortex mitigation device as defined in claim 1 in which at least one of the exit port and the intake port is an elongated slot.

14. An airfoil tip vortex mitigation device as defined in claim 10 in which at least one of the exit port and the intake port is an elongated slot.

15. An airfoil tip vortex mitigation device in which;

an exit port is formed on a distal end of the airfoil;

a channel connects the exit port to an intake port; and the channel and exit port are configured to direct air into an airfoil tip vortex generated by the airfoil when the airfoil is producing lift.

16. An airfoil tip vortex mitigation device as defined in claim 11 in which at least one of the exit port and the intake port is an elongated slot.

17. An airfoil tip vortex mitigation device as defined in claim 15 in which at least one of the exit port and the intake port is an elongated slot.

\* \* \* \* \*